April 11, 1961    A. SOMERVILLE    2,979,617
SCINTILLATION DETECTOR CIRCUIT
Filed Nov. 29, 1957
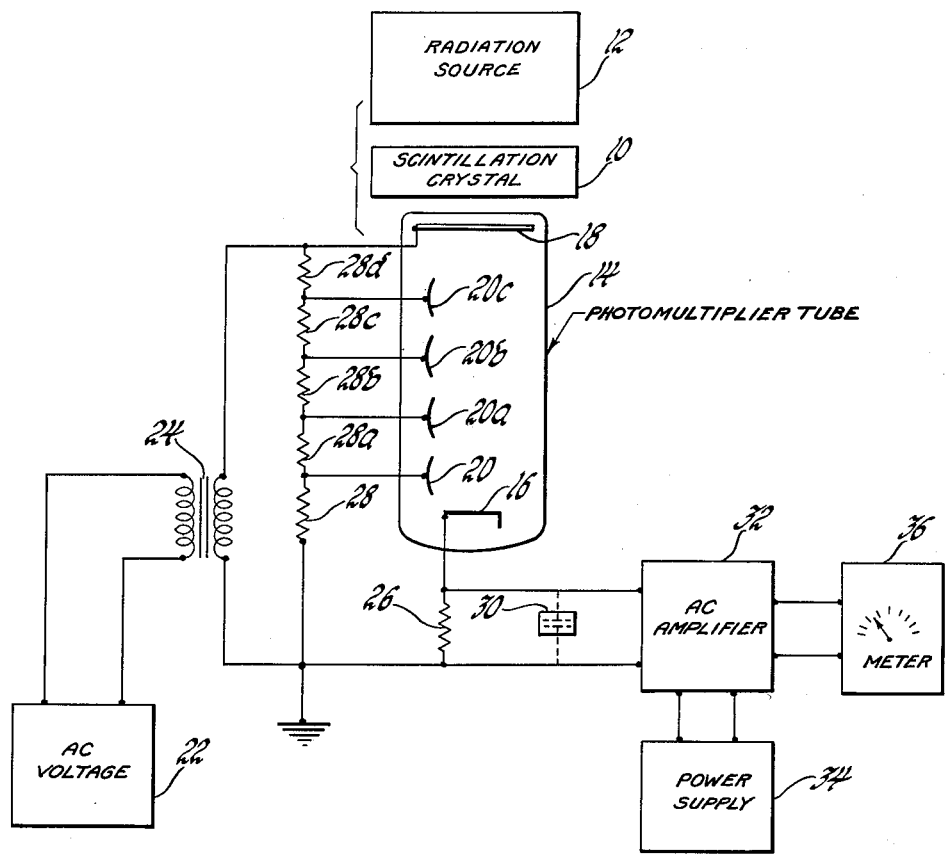
INVENTOR.
Alexander Somerville
BY
E. W. Christen
ATTORNEY United States Patent Office 2,979,617
Patented Apr. 11, 1961

2,979,617

SCINTILLATION DETECTOR CIRCUIT

Alexander Somerville, Birmingham, Mich., assignor to General Motors Corporation, Detroit, Mich., a corporation of Delaware Filed Nov. 29, 1957, Ser. No. 699,780

1 Claim. (Cl. 250—71.5)

This invention relates to the measurement of radiation intensity and more particularly to improvements in scintillation detector circuits.

Detector circuits for nuclear or other radiations are well known which utilize a scintillation transducer responsive to radiation for emitting light pulses at a rate corresponding to intensity of the radiation and photomultiplier tube for translating the light pulses into corresponding electrical pulses. Presently, it is a common practice to energize the photomultiplier tube with a direct voltage and to use an amplifier and counting circuit for detecting and counting individual pulses. Such arrangements have required either a very fast alternating current amplifier followed by an integrator or a low frequency direct current amplifier incorporating a filter or integrating means. Both of these arrangements are costly to construct and the latter is additionally subject to inherent drift.

In accordance with this invention, the photomultiplier tube is energized with alternating voltage which not only facilitates the supply of power but also permits the use of a simple and inexpensive alternating current amplifier having good voltage gain at the frequency of the energizing voltage. Additionally, the individual pulses are integrated to provide a signal voltage corresponding to the time average value of the pulses either by the inherent time constant of the circuit or transducer or by express provision of circuit components. By this simple arrangement, a high degree of accuracy in radiation measurement is attained by relating the frequency of the energizing voltage for the photomultiplier tube to the rate of light pulses from the transducer.

A more complete understanding of this invention may be had from the detailed description which follows taken with the accompanying drawing in which the single figure is a schematic representation of the improved scintillation detector circuit.

Referring now to the drawing, there is shown an illustrative embodiment of the invention in a circuit for measuring the intensity of nuclear or other such radiation. A scintillation transducer 10 such as a crystal is subjected to the radiations emanating from a source 12, the intensity of which is to be measured. The transducer 10 is selected in accordance with the type of radiation to be detected which, for example, may be alpha, beta, gamma, neutron or meson radiations. The transducer has properties such that light pulses are emitted in response to incident radiation and the repetition rate of the pulses corresponds to the intensity of radiation. The transducer 10 is optically coupled with the photosensitive cathode of a photomultiplier tube 14.

The photomultiplier tube 14, suitably of conventional type, comprises a cathode electrode 16, an anode electrode 18, and plural dynode electrodes 20, 20a, 20b, and 20c. For energization of the photomultiplier tube there is provided an alternating voltage source 22 connected to the primary winding of transformer 24. The transformer secondary winding develops the required high voltage value and is connected across the cathode and anode electrodes, 16 and 18, through an output resistor 26. The secondary winding is also connected across the voltage divider comprising series resistors 28, 28a, 28b, 28c and 28d, the successive junctions or taps of which are connected respectively to the dynode electrodes 20, 20a, 20b, and 20c. The voltage source 22 may be any convenient alternating voltage supply such as the standard commercial supply of 117 volts of 60 cycles per second frequency or, if desired, a portable supply having a voltage and frequency of similar order of magnitude. It will be understood that on alternate half-cycles of the voltage supply the dynode electrodes 20, 20a, 20b and 20c, and anode electrode 18 will be energized at successively higher values of positive potential relative to the cathode electrode 16. Accordingly during such half-cycles the occurrence of scintillation of transducer 10 with the impingement of light upon the cathode electrode 16 will cause electron emission therefrom. The emission is successively increased by the action of the dynode electrodes until reaching the anode electrode. Thus a voltage pulse corresponding to the scintillation is developed across the output resistor 26. On the remaining half-cycles of the voltage source 22, the photomultiplier tube is inactive, of course, due to the polarity reversal.

It is preferred to relate the frequency of the source 22 to pulse repetition rate in order to enhance the accuracy of measurement. For this purpose, the frequency of source 22 should be sufficiently low that a significant number of pulses occur during each half-cycle so that a representative sampling of the radiation intensity is obtained. As a lower limit, there should be approximately twenty pulses per half-cycle of the source 22.

In order to obtain a signal voltage corresponding to the time average value of the pulses occurring during each half-cycle of the voltage source 22, integrating means are provided. Such integrating means may be expressly provided by a condenser or by the inherent time constant of the circuits or the transducer. In any event, the time constant should be large relative to the repetition rate of pulses so that the signal voltage across resistor 26 is a time average value of the pulses. For illustrative purposes the integrating means is represented by a condenser 30 shown in phantom lines and connected across the resistor 26.

An alternating current amplifier 32, energized from a suitable power supply 34, has its input terminals connected across the resistor 26 for translation or amplification of the signal voltage. The amplifier 32 is of conventional design with good gain at the frequency of the voltage source 22. This requirement is, of course, readily met by an amplifier having a midband frequency approximately equal to the frequency of the source 22. The output terminals of the amplifier 32 are connected to an indicating means 36 suitably a proportional type indicating instrument such as a moving coil meter.

The operation of the inventive detector circuit will be apparent from the foregoing description. When the transducer 10 is subjected to radiation the scintillations thereof will cause the photomultiplier tube to develop corresponding electrical pulses on alternate half-cycles of the voltage source 22. By virtue of the integrating characteristic of the circuit, a voltage will be developed across resistor 26 corresponding to the time average value of the pulses of each half-cycle. The integrated pulses are in effect gated at the frequency of the source 32 and since the midband frequency of the amplifier 32 corresponds with this frequency, the signal voltage is translated to the indicating means with great efficiency. Accordingly, an accurate indication of the radiation intensity is provided.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claim.

I claim:

A scintillation detector circuit comprising a scintillation transducer responsive to a radiation source for emitting light pulses at a rate corresponding to the intensity of the radiation source, a photomultiplier tube having anode and plural dynode electrodes and having a cathode electrode optically coupled to said transducer, an alternating voltage source connected across said anode and cathode electrodes, a voltage divider connected across the voltage source and having intermediate voltage taps connected with respective dynode electrodes, an output impedance in circuit with said anode and cathode electrodes whereby voltage pulses corresponding to the light pulses are developed across the output impedance during alternate half-cycles of the alternating voltage source, the amplitude of said voltage pulses varying with the amplitude of the alternate half-cycles of the alternating voltage source, an alternating current amplifier having a midband frequency corresponding to the frequency of said voltage source and having its input circuit connected with said output impedance, the aforesaid input circuit being characterized by a time constant which is long relative to the interval between emission of said light pulses but which is short relative to the interval of said alternate half-cycles of the alternating voltage source whereby the voltage applied to the input terminals of said amplifier corresponds to the time average value of said voltage pulses over the interval between the voltage pulses and has a frequency corresponding to the frequency of said source, the frequency of said voltage source being low relative to the rate of said pulses so that a plurality of pulses occur during each half-cycle of said source, and indicating means connected with the output terminals of said amplifier and having a time constant which is long relative to the interval of the half-cycles of said voltage source whereby the time average value of the amplified voltage is indicated thereby.

References Cited in the file of this patent

UNITED STATES PATENTS

| | | |
|---|---|---|
| 2,728,863 | Goodyear | Dec. 27, 1955 |
| 2,809,295 | Reiffel | Oct. 8, 1957 |